Patented Oct. 30, 1923.

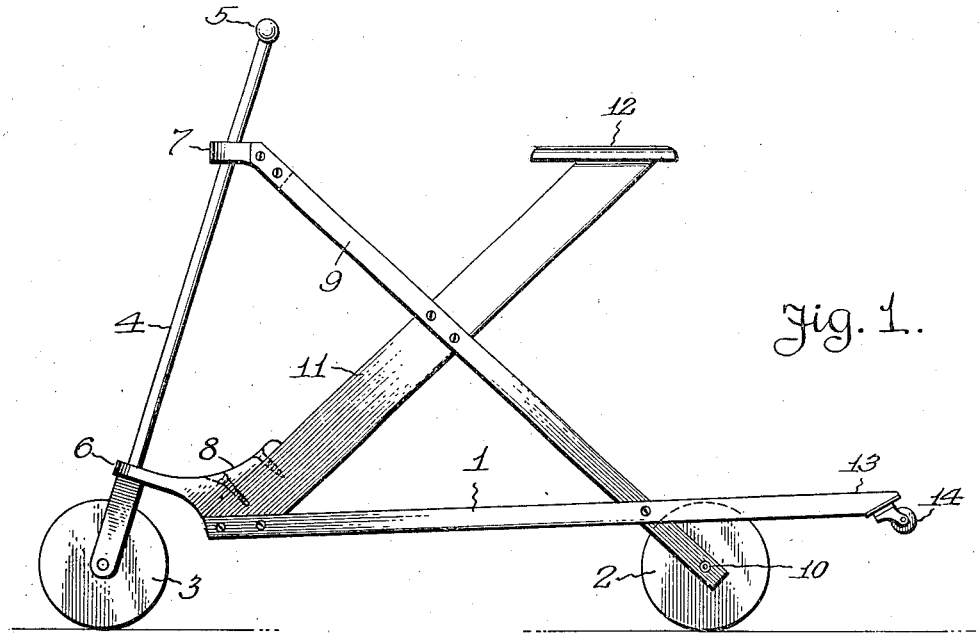
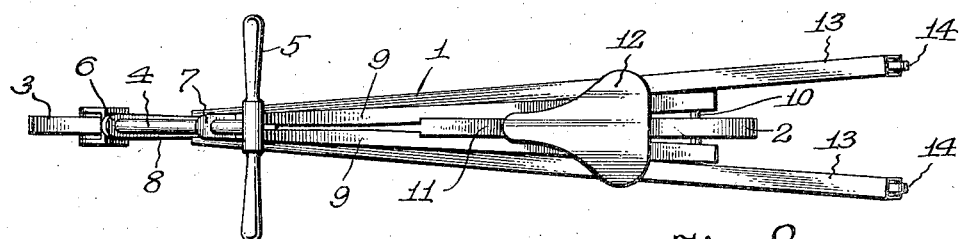
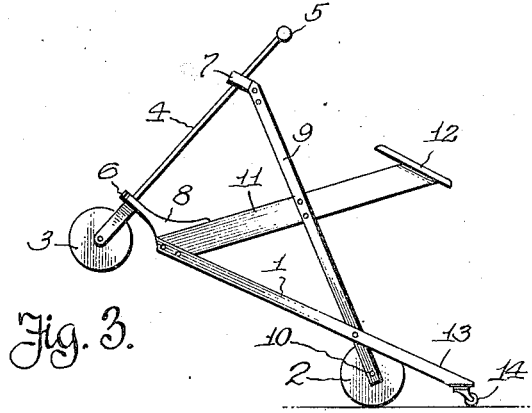

1,472,375

UNITED STATES PATENT OFFICE.

ANDREW W. STUART AND JOHN W. O'CONNOR, OF DETROIT, MICHIGAN.

CHILD'S VEHICLE.

Application filed October 27, 1919. Serial No. 333,635.

*To all whom it may concern:*

Be it known that we, ANDREW W. STUART and JOHN W. O'CONNOR, citizens of the United States of America, residing at Detroit, in the county of Wayne and State of Michigan, have invented certain new and useful Improvements in Children's Vehicles, of which the following is a specification, reference being had therein to the accompanying drawings.

This invention relates to amusement devices, and more particularly to toys or other vehicles for children upon which they may ride and which are propelled by the rider; and an object of the invention is to increase the novelty and attractiveness of the device of this character by so constructing the same that ingenuity and skill may be displayed by the child in riding and manipulating them.

With the above and other ends in view, the invention consists in the novel construction and arrangement of parts and in other matters, all as hereinafter more fully set forth and particularly pointed out in the appended claims, reference being had to the accompanying drowing, in which—

Figure 1 is a side elevation of a device illustrative of the invention;

Fig. 2 is a plan view of the same, and

Fig. 3 is a side elevation illustrating the position to which the device may be tilted in use.

While a construction illustrative of an embodiment of the invention is shown in the drawing, it will be understood that changes in the form and construction of the frame and form or arrangement of the ground wheels or other supporting devices may be made within the scope of the appended claims, without departing from the spirit of the invention and I do not, therefore, limit myself to the type, form or construction of device as shown.

In the drawing, 1 indicates a suitable frame which is supported by a rear ground wheel 2 and a forward steering wheel 3, said steering wheel being rotatively mounted upon a rotatable steering post 4 having a handle 5 at its upper end and mounted within suitable bearings 6 and 7 to turn freely therein. The bearing 6 is in the form of a bracket 8 secured to the forward end of the frame 1 and the bearing 7 is attached to the upper end of the downwardly and rearwardly extending brace bars 9 which diverge downwardly and carry at their lower ends an axle 10 of the ground wheel 2. A seat post 11 is secured to the forward end of the frame 1 and extends upwardly and rearwardly therefrom between the bars 9 to which it is secured. Upon the upper end of the post is a suitable seat 12 for the rider.

The frame 1 comprises rearwardly diverging side members, the rear end portions 13 of which extend beyond the supporting wheel 2 and at their extreme rear ends are provided with caster wheels 14. These caster wheels are normally carried by the frame out of contact with the surface over which the device is propelled, but, upon rearward tilting of the frame upon the wheel 2, said caster wheels are brought into contact with the ground or said surface, as illustrated in Fig. 3, the front or steering wheel 3 being elevated or carried upwardly by the frame as it tilts upon the axle of the wheel 2.

Preferably the seat 12 is so positioned that when the device is running along the ground in normal position, with the wheels 2 and 3 in contact with the ground, the weight of the rider sitting upon the seat 12 will be carried slightly forward of the axle 10 but by shifting his weight rearwardly on the frame or leaning backward, the center of gravity of his body will be shifted rearwardly of the axle 10 and the frame will be tilted rearwardly upon said axle, bringing the caster wheels 14 into contact with the ground, which caster wheels will then form points of support and prevent further rearward tilting. The device will then run upon the wheel 2 and the two caster wheels which are spaced far enough apart to hold the frame in an upright position, that is, will prevent its falling over sidewise.

The device as shown is adapted to be propelled by the rider sitting upon the seat with one or both feet upon the ground so that he may push the vehicle forward with his feet, but it will be understood that, if found desirable, suitable driving means of any well known form may be mounted upon the frame for positively driving the traction wheel 2 and propelling the vehicle.

Further, it is obvious that more than a single traction wheel may be employed and that the device may be steered by a single front wheel, as shown, or by other suitable means provided at either the forward or rear end of the frame and having one or more ground wheels.

In operation, the device will be put under headway and then by leaning backward upon the seat with a firm grasp upon the steering handles, the front end of the machine will be raised from the ground and the caster wheels will be brought into contact with the ground preventing the rearward upsetting of the machine and forming a support upon which it will coast. As these rear wheels 14 are pivoted to the frame to turn about a vertically or upwardly extending axis, having the usual form of caster wheels, the direction of the machine after it is so tilted will be uncertain and may proceed in a straight line, turn to the right or left or swing upon the wheel 2 as a pivot. It will therefore require considerable skill and dexterity on the part of the rider to keep his seat and ingenuity may be displayed in manipulating the vehicle, permitting the rider to do "stunts" and thus greatly increasing the attractiveness to children of this device over the ordinary "push mobile" or similar devices.

The seat may be dispensed with, if so desired, and the child may stand upon the frame, manipulating the device by throwing his weight forwardly or rearwardly of the rear axle, but by providing a support upon which the child may sit, the rearward tilting of the machine will more closely resemble a rearing horse or bronco and this will add further zest to the use of the device by children.

It is obvious that other supporting means than the ground wheels shown, may be employed to roll upon or slide upon the surface over which the device is propelled, any such means used being arranged so that the device may be tilted rearwardly to bring the auxiliary supporting means or caster wheels 14 into contact with said surface and by making the frame in the form of a hobby horse a very novel device will be secured which will be extremely attractive to children.

Having thus fully described our invention, what we claim is:

1. A child's vehicle comprising a frame, front and rear ground wheels for supporting said frame in normal running position, a load carrying member on the frame and positioned to support the load when said frame is in normal position, with the center of gravity of the load forwardly of and adjacent to the transverse vertical plane of the rear ground wheel, whereby a shifting of the load rearwardly will cause the frame to tilt rearwardly upon said rear wheel and raise the front wheel from the ground, and an auxiliary ground wheel carried by said frame rearwardly of the rear ground wheel with said auxiliary wheel out of contact with the ground when the frame is in normal position and positioned to be brought into engagement with the ground by the rearward tilting of the frame upon the rear ground wheel, said auxiliary wheel being pivotally attached to said frame to turn laterally, whereby the rear end of the frame is free to swing laterally when said auxiliary wheel is in contact with the ground and the vehicle is free to swerve laterally during its progress in tilted position.

2. A child's vehicle comprising a frame, front and rear ground wheels for supporting said frame in normal running position, a load carrying member on the frame and positioned to support the load when said frame is in normal position, with the center of gravity of the load forwardly of and adjacent to the transverse vertical plane of the rear ground wheel, said frame having a rearward extension extending rearwardly beyond the rear ground wheel, and an auxiliary ground wheel pivotally attached to said rearward extension of said frame and supported thereby out of contact with the ground when the frame is in normal running position and to be brought into engagement with the ground by the rearward tilting of the frame upon the rear ground wheel, said auxiliary wheel being pivotally attached to the frame by an upwardly extending pivot permitting free lateral turning movement of the auxiliary wheel during its progress in contact with the ground.

3. A child's vehicle comprising a frame having rearwardly extending divergent frame members, front and rear ground wheels for supporting said frame in normal running position with the rear ground wheel attached to the frame at a distance forwardly of the rear ends of the rearwardly extending divergent members of the frame, a load carrying member on the frame and positioned to support the load when said frame is in normal position, with the center of gravity of the load forwardly of and adjacent to the transverse vertical plane of the rear ground wheel, and caster wheels carried by the rear ends of the rearwardly divergent frame members, said caster wheels being out of contact with the ground during the normal running position of the frame and to be brought into contact with the ground by a rearward tilting of the frame upon the rear ground wheel, said caster wheels being spaced apart transversely of the vehicle to provide side supports for the frame when said wheels are in contact with the ground and the frame is in tilted position.

In testimony whereof we affix our signatures in presence of two witnesses.

ANDREW W. STUART.
JOHN W. O'CONNOR.

Witnesses:
 ANNA M. DORR,
 CHAS. W. STAUFFIGER.